(12) United States Patent
Chan et al.

(10) Patent No.: US 12,326,537 B2
(45) Date of Patent: Jun. 10, 2025

(54) OPTICAL TRACKING DEVICE

(71) Applicant: PixArt Imaging Inc., Hsin-Chu (TW)

(72) Inventors: Ching Geak Chan, Hsin-Chu (TW); Chung-Ting Yang, Hsin-Chu (TW); Feng-Chi Liu, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 623 days.

(21) Appl. No.: 17/336,326

(22) Filed: Jun. 2, 2021

(65) Prior Publication Data

US 2022/0390646 A1    Dec. 8, 2022

(51) Int. Cl.
*G01V 8/10* (2006.01)
*G06T 7/246* (2017.01)

(52) U.S. Cl.
CPC ............ *G01V 8/10* (2013.01); *G06T 7/246* (2017.01); *G06T 2207/10144* (2013.01); *G06T 2207/10152* (2013.01); *G06T 2207/30204* (2013.01)

(58) Field of Classification Search
CPC . G01V 8/10; G06T 7/246; G06T 2207/10144; G06T 2207/10152; G06T 2207/30204; G06T 2207/10004; G06T 7/521; G06T 7/248; G06T 7/74; G06T 2207/30244; H04N 23/61; H04N 23/71; H04N 23/70–80; H04N 5/33; H04N 23/51; H04N 23/56; H04N 23/54; H04N 23/52; H04N 23/55; H04N 23/60; H04N 23/45; H04N 7/183; H04N 5/23299; G01D 1/14; G01D 21/00; G01D 21/02; G01B 11/026; G01B 11/005; G01B 11/002; G01B 11/022; G01B 11/028; G01B 11/03; G01B 11/043; G01B 11/046; G01B 11/04; G01B 11/14; G01B 11/285; G01B 11/28; G01S 17/46; G01S 17/50; G01S 17/66; G01S 7/4808; G01S 7/4815; G01S 7/4816; G01S 17/08; G01S 17/48; G01S 17/06; G01S 17/04; G01S 17/02; G01S 17/42; G01S 17/58; G09F 9/301; G09F 9/302; G09F 9/33; G09F 9/335; G09F 9/35; G09F 9/405; G09F 9/46; H10K 2102/311; H10K 77/10; H10K 77/111; H10K 59/40; G03B 17/56;
(Continued)

(56) References Cited

U.S. PATENT DOCUMENTS

7,378,643 B2 * 5/2008 Lum ................. G01D 5/34715
250/221
2013/0314691 A1 * 11/2013 Hsu ........................ G01S 17/48
356/4.01
(Continued)

*Primary Examiner* — Christina A Riddle
(74) *Attorney, Agent, or Firm* — Winston Hsu (57) ABSTRACT

An optical tracking device is used to track a target object. An outer surface of the target object is divided into a first region and a second region adjacent to each other, and a marker is disposed on the first region. The optical tracking device includes an optical sensor and an operation processor. The optical sensor has auto exposure function and is adapted to acquire a detection image containing at least one of the first region and the second region. The operation processor is electrically connected to the optical sensor and adapted to analyze variation of an exposure parameter of the auto exposure function for determining whether the first region is appeared in the detection image, so as to acquire an operation datum of the target object.

15 Claims, 7 Drawing Sheets

(58) Field of Classification Search
CPC ...... G02B 27/32; G02B 27/34; G02B 6/4219; G02B 6/422; G02B 6/4221; G02B 6/4224; G06F 3/03; G06F 3/0304; G06F 3/033; G06F 3/03542; G06F 3/03545; G06F 3/30547; G06F 3/3548; G06F 3/3062; G06F 3/038
USPC .......... 356/3–22, 614–640; 348/169, 333.03; 345/158, 169, 173–179, 181; 382/103, 382/181, 190, 192, 195, 199, 201, 202, 382/203, 204
See application file for complete search history.

(56) References Cited

U.S. PATENT DOCUMENTS

| | | | | |
|---|---|---|---|---|
| 2016/0065866 | A1* | 3/2016 | Hsu | H04N 25/75 |
| | | | | 348/250 |
| 2017/0061226 | A1* | 3/2017 | Kok | G06V 10/955 |
| 2017/0263015 | A1* | 9/2017 | Teo | H04N 19/00 |
| 2018/0348373 | A1* | 12/2018 | Chen | G01S 7/4815 |
| 2019/0278098 | A1* | 9/2019 | Prest | G06F 3/0317 |
| 2020/0089331 | A1* | 3/2020 | Yang | G06F 3/0362 |
| 2021/0123720 | A1* | 4/2021 | Leong | G01B 21/047 |
| 2022/0012915 | A1* | 1/2022 | He | A61B 1/045 |

\* cited by examiner

OPTICAL TRACKING DEVICE

BACKGROUND OF THE INVENTION

1. Field of the Invention

The present invention relates to an optical tracking device, and more particularly, to an optical tracking device of tracking a target object.

2. Description of the Prior Art

A conventional optical detection device includes an optical sensor with an auto exposure function. The auto exposure function automatically adjusts illumination intensity according to environmental illumination, so that the optical sensor can clearly identify an identification feature on a target object for acquiring a correct movement trace of the target object. If the optical sensor is prepared to identify a dark marker disposed on the target object, the conventional optical detection device has to shut down the auto exposure function, and then the optical sensor can observe a grey level variation of a detection image to determine whether the dark marker is moved into a monitoring region of the optical sensor. Thus, the auto exposure function of the conventional optical detection device is turned on to execute an identification feature detection mode and further turned off to execute the mark detection mode, so the conventional optical detection device has drawbacks of worse operational experience and inconvenient manipulation.

SUMMARY OF THE INVENTION

The present invention provides an optical tracking device of tracking a target object for solving above drawbacks.

According to the claimed invention, an optical tracking device is used to track a target object. An outer surface of the target object is divided into a first region and a second region adjacent to each other, and a marker is disposed on the first region. The optical tracking device includes an optical sensor and an operation processor. The optical sensor has auto exposure function and is adapted to acquire a detection image containing at least one of the first region and the second region. The operation processor is electrically connected to the optical sensor and adapted to analyze variation of an exposure parameter of the auto exposure function for determining whether the first region is appeared in the detection image, so as to acquire an operation datum of the target object.

According to the claimed invention, the outer surface is further divided into the first region, the second region and a third region adjacent to each other, the first region and the third region both have the marker, and the operation processor analyzes the variation of the exposure parameter for determining whether the first region or the third region is appeared in the detection image. The optical tracking device is used to distinguish the target object from a substituted object, the substituted object has another marker, and the operation processor analyzes the variation of the exposure parameter for determining whether the marker or the another marker is appeared in the detection image, so as to ensure the optical tracking device is applied for the target object or the substituted object.

According to the claimed invention, the optical tracking device further includes a memory module electrically connected to the operation processor and adapted to store data of a first specific range and a second specific range, and the operation processor compares the exposure parameter with the first specific range and the second specific range to determine the detection image contains the first region or the second region. A value of the first specific range is greater than a value of the second specific range. The operation processor determines the first region is appeared in the detection image when the exposure parameter is located inside the first specific range.

According to the claimed invention, the operation processor analyzes a number of times of the exposure parameter inside the first specific range, to acquire attached information of the target object via the marker. The operation processor determines the first region is appeared in the detection image when a continued period of the exposure parameter inside the first specific range conforms to a period threshold. The operation processor analyzes the number of times and the continued period of the exposure parameter inside the first specific range, to acquire attached information of the target object via the marker.

According to the claimed invention, when the exposure parameter is located inside the second specific range, the operation processor determines the second region is appeared in the detection image and analyzes an identification feature of the second region to acquire a movement of the target object.

According to the claimed invention, the marker on the first region has a first material property, the second region has a second material property, and a reflectivity of the first material property is lower than a reflectivity of the second material property.

According to the claimed invention, the optical tracking device further includes a light source electrically connected to the operation processor for illumination, and the operation processor adjusts the light source to locate the exposure parameter inside the second specific range when the second region is appeared in the detection image. The operation processor increases a working period or a driving current of the light source for high illumination.

According to the claimed invention, the auto exposure function is turned on when the optical sensor acquires the detection image containing the first region or the second region. The exposure parameter is a length of an exposure period of the optical sensor.

The optical tracking device of the present invention can utilize the auto exposure function to detect the movement of the target object and the marker on the target object, and further can decode the attached information hidden within the pattern of the marker for determining a category and motion of the target object by analyzing the number of times and the continued period of the exposure parameter. The outer surface of the target object preferably can be made by the metal with high reflectivity, and the marker can be a pattern engraved on the high-reflectivity metal or a dark layer coated on the high-reflectivity metal. The exposure parameter of the auto exposure function can be varied when the marker and the non-marker area on the target object are captured by the optical sensor, and the operation processor can decide that the marker is moved into the monitoring area of the optical sensor in response to the exposure parameter continuously kept in the high-level specific range; accordingly, the operation processor can increase the illumination of the light source so that the optical sensor can generate the low exposure parameter when the non-marker area is detected.

The optical tracking device of the present invention can be applied for the portable communication apparatus, and other kinds of switches or joysticks. The exposure parameter of the auto exposure function can be varied via an electronic switch or a physical switch, which depends on the actual demand. The present invention does not shut down the auto exposure function of the optical sensor, and the optical tracking device can accurately detect whether the marker on the target object is moved into the monitoring area of the optical sensor via the turned-on auto exposure function.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
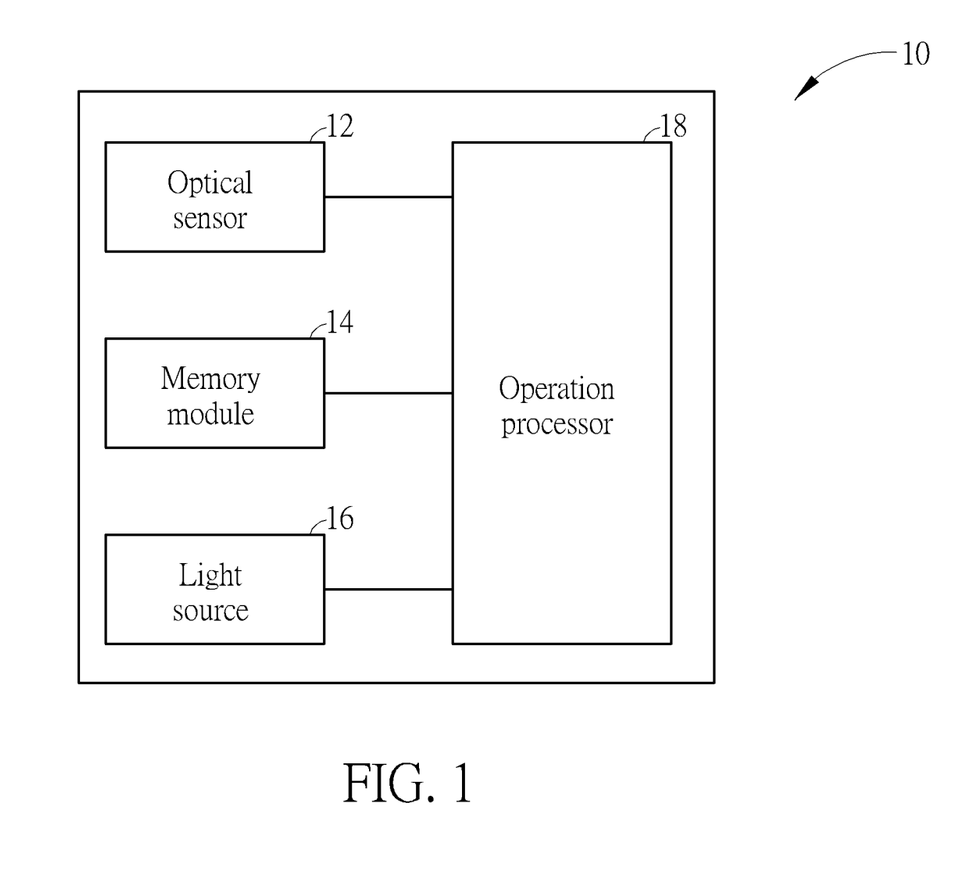
FIG. 1 is a functional block diagram of an optical tracking device according to an embodiment of the present invention.
Figure 2:
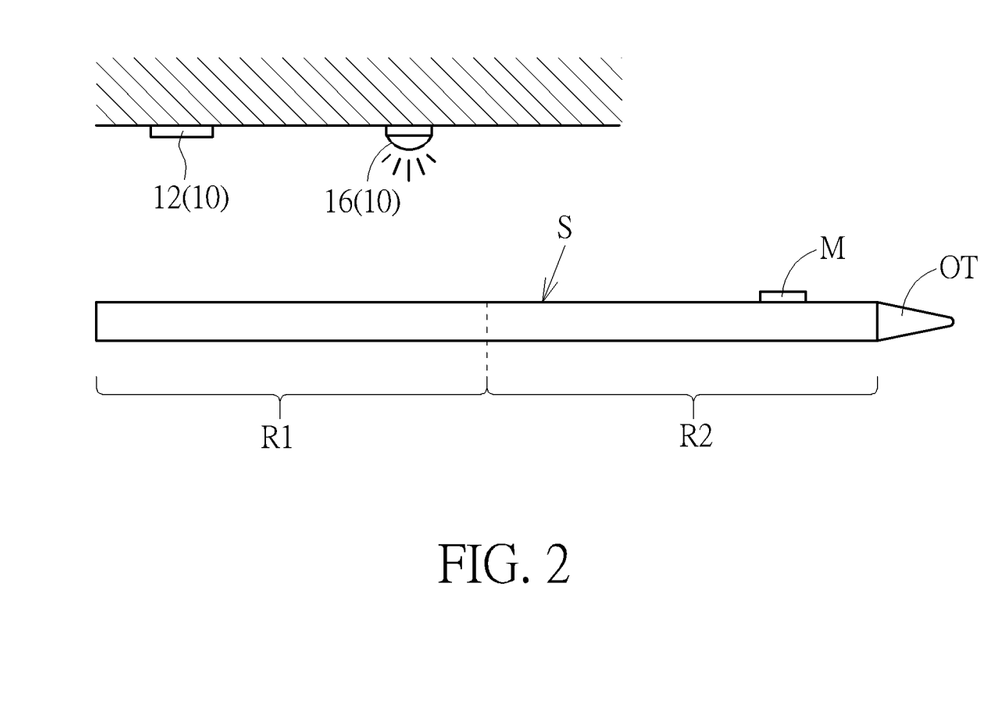
FIG. 2 is a diagram of the optical tracking device and a target object according to the embodiment of the present invention.

Please refer to FIG. 1 and FIG. 2. FIG. 1 is a functional block diagram of an optical tracking device 10 according to an embodiment of the present invention. FIG. 2 is a diagram of the optical tracking device 10 and a target object OT according to the embodiment of the present invention. The optical tracking device 10 can track a movement of the target object OT. An outer surface S of the target object OT can be divided into a first region R1 and a second region R2 adjacent to each other. A marker M can be disposed on at least one of the first region R1 and the second region R2. In the embodiment, the marker M can be disposed on the first region R1; position of the marker M is not limited to the above-mentioned embodiment and can depend on an actual application. The optical tracking device 10 can analyze parameter variation generated by an auto exposure function to identify the marker M, so as to determine a track of the target object OT moved relative to the optical tracking device 10.

The optical tracking device 10 can include an optical sensor 12, a memory module 14, a light source 16 and an operation processor 18. The operation processor 18 can be electrically connected to the optical sensor 12, the memory module 14 and the light source 16. The optical sensor 12 can acquire a detection image containing at least one of the first region R1 and the second region R2, and have the auto exposure function which can adaptively adjust an exposure parameter in accordance with environmental illumination, so that the detection image can have preferred quality; the exposure parameter can be a length of an exposure period, an aperture value or a shutter speed. The memory module 14 can store the detection image acquired by the optical sensor 12, and further can store preset data applied for analyzing the detection image and the exposure parameter. The memory module 14 can be independent of the operation processor 18, or be a built-in unit of the operation processor 18. The light source 16 can provide illumination, and the illumination can be adjusted by a command of the operation processor 18.

Generally, the marker M can have a first material property, and the first region R1 excluding the marker M and the second region R2 can have a second material property; reflectivity of the first material property can be lower than reflectivity of the second material property. In the embodiment, the outer surface S of the target object OT can be light color or have high reflectivity (which means the second material property), and the marker M can be dark color or have low reflectivity (which means the first material property). Thus, when the target object OT is moved relative to the optical tracking device 10 and the outer surface S where excludes the marker M is moved into a monitoring area of the optical sensor 12, the auto exposure function of the optical sensor 12 can generate the exposure parameter with a lower value, such as the short exposure period; if the marker M is moved into the monitoring area of the optical sensor 12, the auto exposure function of the optical sensor 12 can generate the exposure parameter with a higher value, such as the long exposure period. The operation processor 18 can analyze variation of the exposure parameter generated by the auto exposure function to determine whether the marker M within the first region R1 is appeared in the detection image, and then acquire the movement of the target object OT relative to the optical tracking device 10 according to a determination result; the movement can be interpreted as an operation command output by the user who holds the target object OT.

Figure 3:
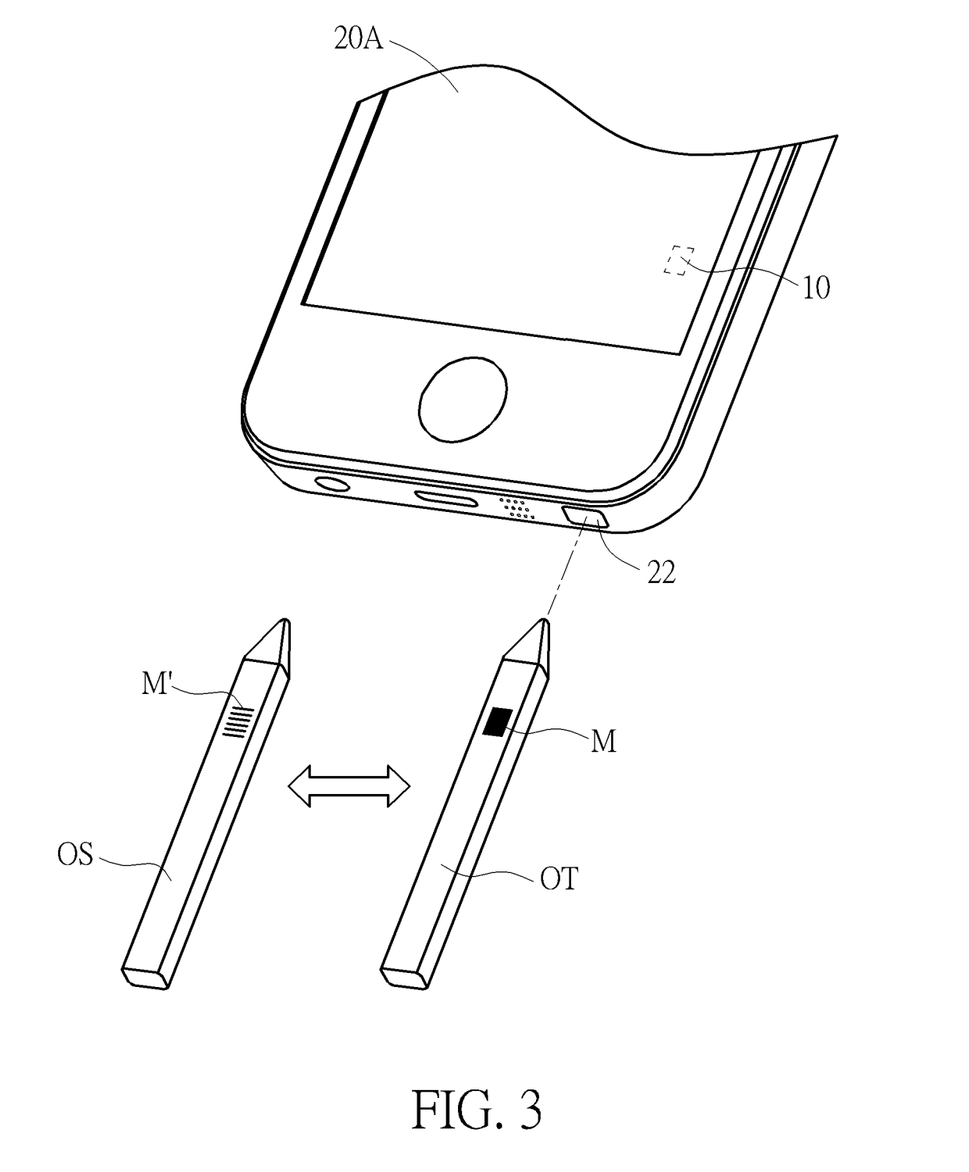
FIG. 3 is an application diagram of the optical tracking device according to a first embodiment of the present invention.
Figure 4:
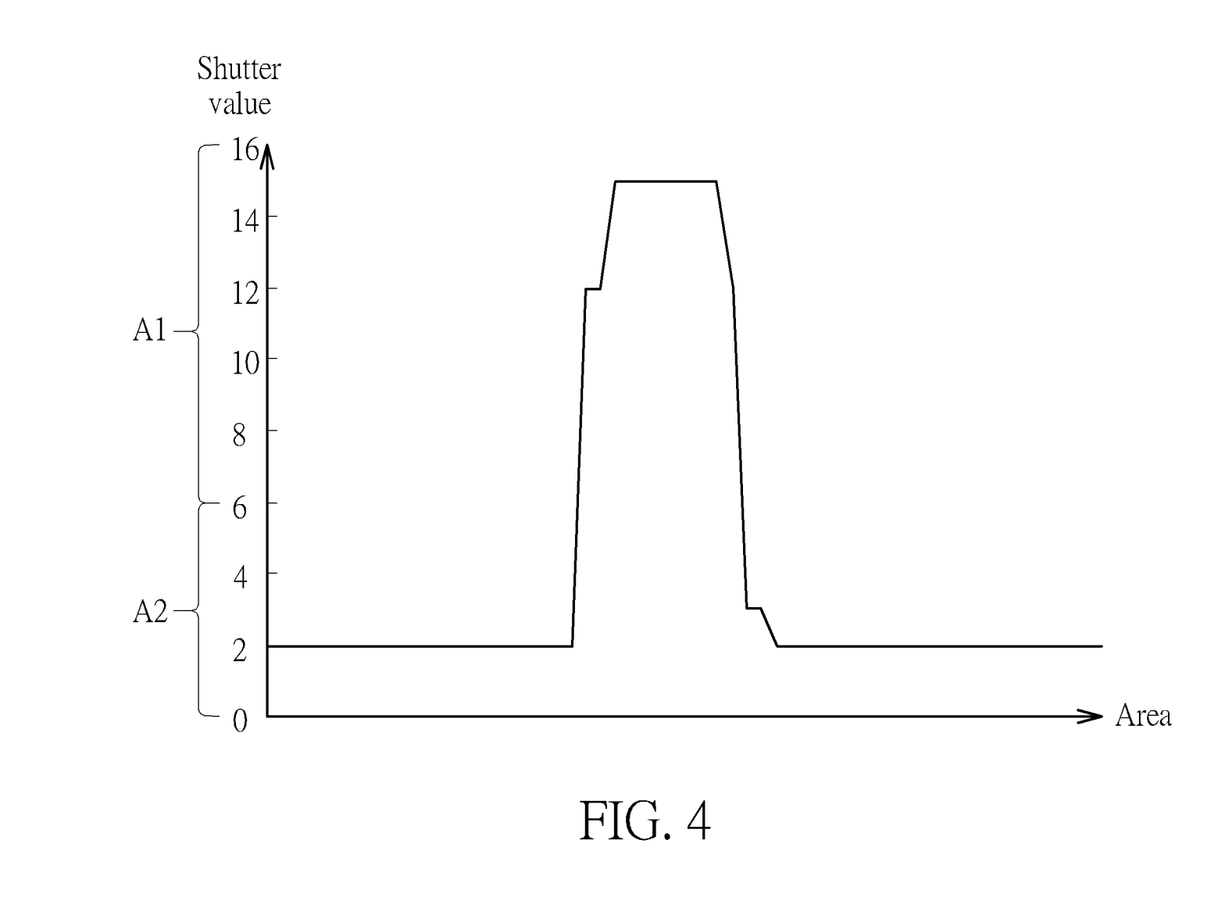
FIG. 4 and FIG. 5 are diagrams of the exposure parameter varied according to different markers according to the first embodiment of the present invention.
Figure 5:
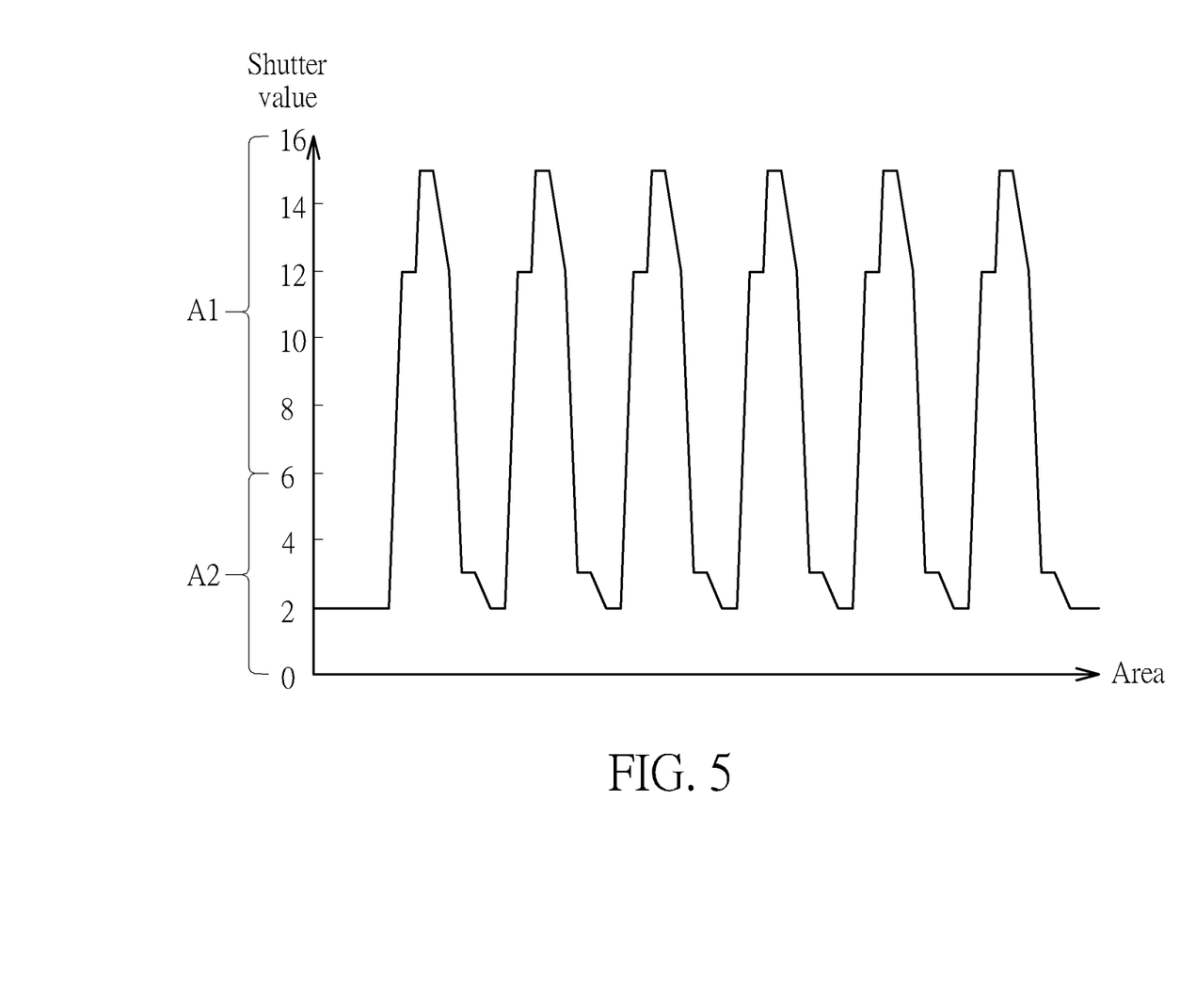

Please refer to FIG. 3 to FIG. 5. FIG. 3 is an application diagram of the optical tracking device 10 according to a first embodiment of the present invention. FIG. 4 and FIG. 5 are diagrams of the exposure parameter varied according to the markers M and M' according to the first embodiment of the present invention. As shown in FIG. 3, the optical tracking device 10 can be disposed inside a hold 22 on a portable communication apparatus 20A, and the target object OT can be a stylus for being inserted into the hold 22 on the portable communication apparatus 20A. The marker M can be disposed on a front end or a rear end of the target object OT. The memory module 14 can store data of a first specific range A1 and a second specific range A2; for example, the exposure parameter within the first specific range A1 can be ranged between values 6~16, and the exposure parameter within the second specific range A2 can be ranged between values 0~6, as shown in FIG. 4 and FIG. 5; actual values of the first specific range A1 and the second specific range A2 are not limited to the above-mentioned embodiment, which depend on design demand. The exposure parameter varied within the first specific range A1 can be interpreted as the marker M moved into the monitoring area of the optical sensor 12, so that a boundary of the first specific range A1 is greater than a boundary of the second specific range A2.

In the present invention, the auto exposure function is turned on when the optical sensor 12 acquires the detection image containing at least one of the first region R1 and the second region R2. The marker M and a non-marker area (which means an area of the first region R1 excluding the marker M and the second region R2) of the target object OT can respectively have specific material property. When the monitoring area of the optical sensor 12 aligns with the marker M or the non-marker area, the exposure parameter of the auto exposure function can be varied due to difference in the material property. For ensuring variation of the exposure parameter can have sufficient amplitude when the optical tracking device 10 acquires the detection image containing the marker M, the illumination of the light source 16 can be increased to a high level for setting the exposure parameter within the second specific range A2 as if the detection image containing the second region R2 is acquired. A working period or a driving current of the light source 16 can be increased to generate the high-level illumination; however, a method of increasing the illumination is not limited to the above-mentioned embodiment, and depends on the design demand.

The target object OT is inserted into a bottom of the hole 22, and the marker M can be moved into the monitoring area of the optical tracking device 10; in the meantime, the optical sensor 12 needs the longer exposure period to acquire the detection image with preferred quality because of the darker marker M, so the auto exposure function can generate the high exposure parameter. The optical tracking device 10 can compare the high exposure parameter with the first specific range A1 and the second specific range A2, and get a result of the high exposure parameter located inside the first specific range A1; thus, the optical tracking device 10 can determine that the marker M is detected (which means the first region R1 is captured by the detection image), and decide the target object OT is stored in a correct position and then may drive the portable communication apparatus 20A to execute a related application program. If the target object OT is inserted into a half of the hole 22 and therefore the portable communication apparatus 20A does not detect the marker M (which means the second region R2 is captured by the detection image), the auto exposure function can generate the low exposure parameter; the optical tracking device 10 can determine the low exposure parameter is located inside the second specific range A2, which is interpreted as the marker M not entering the monitoring area of the optical tracking device 10, so that the optical tracking device 10 can decide the target object OT is not in the correct position, and can output a warning reminder to notify the user of adjusting the stylus.

When the optical tracking device 10 determines the exposure parameter is located inside the second specific range A2, the second region R2 of the target object OT can be appeared in the detection image, which means the marker M is not stayed inside the monitoring area of the optical tracking device 10. In this situation, the optical tracking device 10 can analyze variation of identification features within the second region R2 to acquire the movement of the target object OT. The identification features may be a pattern preset on the second region R2, or an original and identifiable coarse structure of the second region R2, which depends on the design demand.

The target object OT (which means the stylus) can be fully separated from the hole 22 on the portable communication apparatus 20A, and therefore the portable communication apparatus 20A may be optionally assembled with a substituted object OS. The substituted object OS can be another stylus or any other structural unit. The substituted object OS can have another marker M', and a style of the marker M' may be different from a style of the marker M. The optical tracking device 10 can analyze variation of the exposure parameter of the auto exposure function to determine the optical sensor 12 detects the marker M or the marker M', and further decide an object assembled with the portable communication apparatus 20A belongs to the target object OT or the substituted object OS. For example, the marker M can be a rectangle dark pattern and the marker M' can be a striped dark pattern. If the optical tracking device 10 detects the auto exposure function always outputs the high exposure parameter in a predefined period, which may represent that a continued period of the exposure parameter inside the first specific range A1 conforms to a period threshold, as shown in FIG. 4, and the optical tracking device 10 can decide that the marker M is detected; the period threshold may be pre-stored in the memory module 14. If the optical tracking device 10 detects the exposure parameter of the auto exposure function is frequently risen and fallen in a short time, and a number of times of the exposure parameter inside and outside the first specific range A1 conforms to a number threshold, the optical tracking device 10 can detect the marker M', as shown in FIG. 5.

It should be mentioned that the present invention further can convert a dimension and density of the stripe in a pattern of the markers M and M' into code for recording attached information of the target object OT and the substituted object OS. As an example shown in FIG. 3, the marker M is a one dark pattern, and the attached information may be an owner datum of the target object OT; the marker M' includes six dark strips with the same width, and the attached information can be the owner datum of the substituted object O. Another marker (not shown in the figures) may include five dark strips with the same width, or include six dark strips with different widths, or some stripes with any numbers and dimensions. Therefore, the optical tracking device 10 can analyze the number of times, or the continued period, or the number of times and the continued period of the exposure parameter inside the first specific range A1, to decode the attached information of the target object OT by the marker M and the attached information of the substituted object O by the marker M'.

Figure 6:
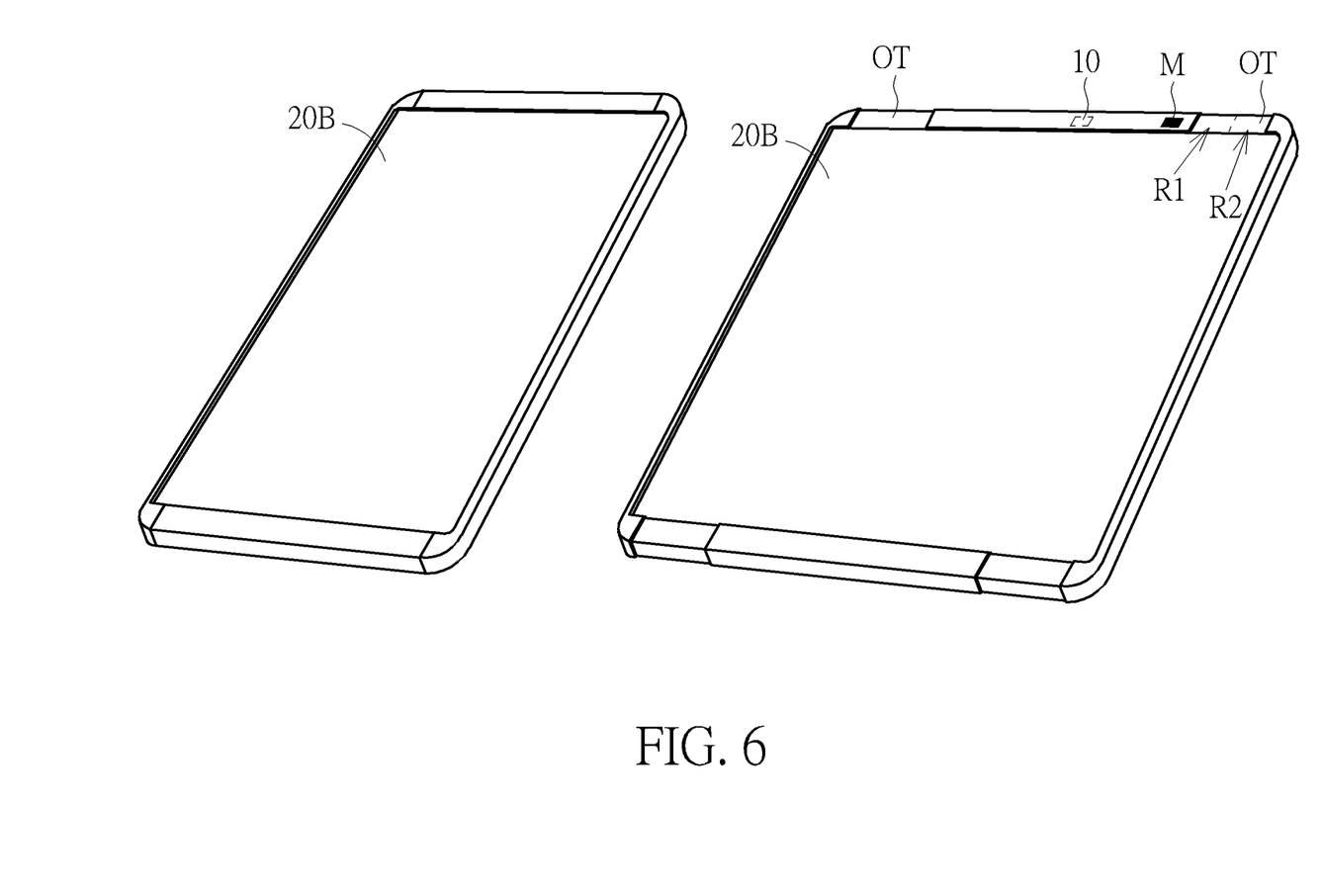
FIG. 6 is an application diagram of the optical tracking device according to a second embodiment of the present invention.

Please refer to FIG. 6. FIG. 6 is an application diagram of the optical tracking device 10 according to a second embodiment of the present invention. As shown in FIG. 6, the portable communication apparatus 20B can have a stretchable display screen, and the target object OT can be a slide bar inside the portable communication apparatus 20B, and the optical tracking device 10 can be disposed inside a casing of the portable communication apparatus 20B. The marker M can be disposed on a lateral end of the target object OT. If the stretchable display screen of the portable communication apparatus 20B is shortened, the marker M is not located inside the monitoring area of the optical tracking device 10, and the portable communication apparatus 20B can display a small size screen frame on the stretchable display screen; if two opposite sides of the stretchable display screen are lengthened, the marker M can be located inside the monitoring area of the optical tracking device 10, and the portable communication apparatus 20B can display a large size screen frame on the stretchable display screen.

Figure 7:
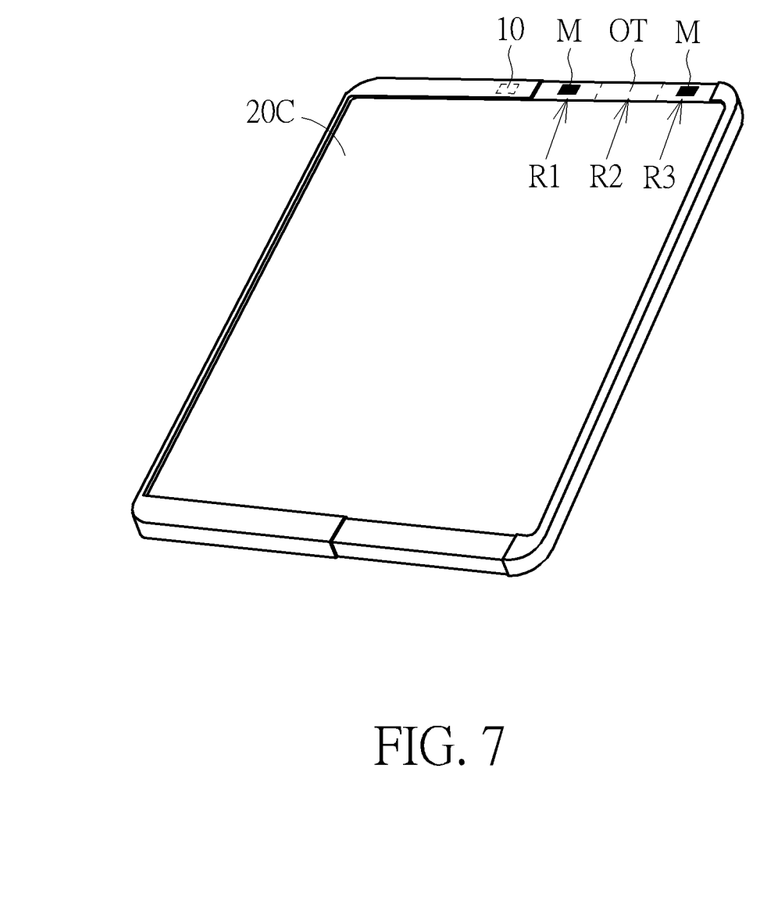
FIG. 7 is an application diagram of the optical tracking device according to a third embodiment of the present invention.

In the second embodiment, a left region and a right region of the target object OT can be respectively represented as the first region R1 and the second region R2, and the marker M can be disposed on the first region R1 close to the optical tracking device 10; position of the marker M is not limited to the above-mentioned embodiment, which depends on an actual demand. Please refer to FIG. 7. FIG. 7 is an application diagram of the optical tracking device 10 according to a third embodiment of the present invention. As shown in FIG. 7, the optical tracking device 10 can be located inside the casing of the portable communication apparatus 20C, and the outer surface S of the target object OT can be divided into the first region R1, the second region R2 and a third region R3 adjacent to each other. The first region R1 and the third region R3 can respectively have the marker M. The portable communication apparatus 20C can have the stretchable display screen. When the stretchable display screen of the portable communication apparatus 20C is lengthened to a right direction, the marker M on the first region R1 can be detected by the optical tracking device 10; when the stretchable display screen of the portable communication apparatus 20C is shortened, the marker M on the third region R3 can be detected by the optical tracking device 10.

The marker M on the first region R1 can have the style different from the style of the marker M on the third region R3; for example, the marker M on the first region R1 can be the rectangle dark pattern, and the marker M on the third region R3 can be the striped dark pattern. If the optical tracking device 10 analyzes that the auto exposure function continuously outputs the high exposure parameter in the predefined period, the marker M on the first region R1 can be detected by the optical tracking device 10, and the portable communication apparatus 20C can show the large size screen frame on the stretchable display screen. If the optical tracking device 10 analyzes that the exposure parameter of the auto exposure function is frequently risen and fallen in the short time, the marker M on the third region R3 can be detected by the optical tracking device 10, and the portable communication apparatus 20C can show the small size screen frame on the stretchable display screen.

In conclusion, the optical tracking device of the present invention can utilize the auto exposure function to detect the movement of the target object and the marker on the target object, and further can decode the attached information hidden within the pattern of the marker for determining a category and motion of the target object by analyzing the number of times and the continued period of the exposure parameter. The outer surface of the target object preferably can be made by the metal with high reflectivity, and the marker can be a pattern engraved on the high-reflectivity metal or a dark layer coated on the high-reflectivity metal. The exposure parameter of the auto exposure function can be varied when the marker and the non-marker area on the target object are captured by the optical sensor, and the operation processor can decide that the marker is moved into the monitoring area of the optical sensor in response to the exposure parameter continuously kept in the high-level specific range; accordingly, the operation processor can increase the illumination of the light source so that the optical sensor can generate the low exposure parameter when the non-marker area is detected.

The optical tracking device of the present invention can be applied for the portable communication apparatus, and other kinds of switches or joysticks. The exposure parameter of the auto exposure function can be varied via an electronic switch or a physical switch, which depends on the actual demand. Comparing to the prior art, the present invention does not shut down the auto exposure function of the optical sensor, and the optical tracking device can accurately detect whether the marker on the target object is moved into the monitoring area of the optical sensor via the turned-on auto exposure function.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical tracking device of tracking a target object, an outer surface of the target object being divided into a first region and a second region adjacent to each other, and a marker being disposed on the first region, the optical tracking device comprising:
   an optical sensor configured to enable an auto exposure function to get detection images with the same quality and containing the first region and the second region, and immediately generate different exposure parameters in response to the detection images; and
   an operation processor electrically connected to the optical sensor and adapted to analyze a difference between real-time exposure parameters of different detection images for determining whether the marker appears in one of the detection images, so as to acquire an operation datum of the target object.

2. The optical tracking device of claim 1, wherein the outer surface is further divided into the first region, the second region and a third region adjacent to each other, the first region and the third region both have the marker, and the operation processor analyzes the variation of the exposure parameter for determining whether the first region or the third region appears in the detection image.

3. The optical tracking device of claim 1, wherein the optical tracking device is used to distinguish the target object from a substituted object, the substituted object has another marker, and the operation processor analyzes the variation of the exposure parameter for determining whether the marker or the another marker appears in the detection image, so as to ensure the optical tracking device is applied for the target object or the substituted object.

4. The optical tracking device of claim 1, wherein the optical tracking device further comprises a memory module electrically connected to the operation processor and adapted to store data of a first specific range and a second specific range, and the operation processor compares the exposure parameter with the first specific range and the second specific range to determine the detection image contains the first region or the second region.

5. The optical tracking device of claim 4, wherein a value of the first specific range is greater than a value of the second specific range.

6. The optical tracking device of claim 4, wherein the operation processor determines the first region appears in the detection image when the exposure parameter is located inside the first specific range.

7. The optical tracking device of claim 6, wherein the operation processor analyzes a number of times of the exposure parameter inside the first specific range, to acquire attached information of the target object via the marker.

8. The optical tracking device of claim 6, wherein the operation processor determines the first region appears in the detection image when a continued period of the exposure parameter inside the first specific range conforms to a period threshold.

9. The optical tracking device of claim 8, wherein the operation processor analyzes the number of times and the continued period of the exposure parameter inside the first specific range, to acquire attached information of the target object via the marker.

10. The optical tracking device of claim 4, wherein when the exposure parameter is located inside the second specific range, the operation processor determines the second region appears in the detection image and analyzes an identification feature of the second region to acquire a movement of the target object.

11. The optical tracking device of claim 4, wherein the optical tracking device further comprises a light source electrically connected to the operation processor for illumination, and the operation processor adjusts the light source to locate the exposure parameter inside the second specific range when the second region appears in the detection image.

12. The optical tracking device of claim 11, wherein the operation processor increases a working period or a driving current of the light source for high illumination.

13. The optical tracking device of claim 1, wherein the marker on the first region has a first material property, the second region has a second material property, and a reflectivity of the first material property is lower than a reflectivity of the second material property.

14. The optical tracking device of claim 1, wherein the auto exposure function is turned on when the optical sensor acquires the detection image containing the first region or the second region.

15. The optical tracking device of claim 1, wherein the exposure parameter is a length of an exposure period of the optical sensor.

* * * * *